United States Patent [19]

Rezanka et al.

[11] Patent Number: 4,531,759
[45] Date of Patent: Jul. 30, 1985

[54] SUSPENSION STRUT FOR VEHICLES WITH ONBOARD SERVICE OF SHOCK ABSORBER CARTRIDGE

[75] Inventors: Richard L. Rezanka, Warren; Bernard J. Finn, Troy, both of Mich.

[73] Assignee: General Motors Corporation, Detroit, Mich.

[21] Appl. No.: 520,476

[22] Filed: Aug. 4, 1983

[51] Int. Cl.³ .................. B60G 15/06; F16F 3/08; F16F 9/54

[52] U.S. Cl. ..................... 280/668; 29/227; 29/402.08; 29/402.17; 188/321.11; 188/322.19; 267/8 R; 267/152; 267/153; 280/688

[58] Field of Search ............ 280/668, 688, 701; 188/322.21, 322.22, 322.19, 322.11, 321.11; 267/8 R, 33, 140.2, 152, 153; 29/227, 402.08, 402.17, 426.4

[56] References Cited

U.S. PATENT DOCUMENTS

| | | | |
|---|---|---|---|
| 4,042,259 | 8/1977 | Fiedler et al. | 29/227 X |
| 4,175,771 | 11/1979 | Muzechuk et al. | 267/8 R X |
| 4,256,292 | 3/1981 | Sullivan, Jr. et al. | 267/8 R |
| 4,274,655 | 6/1981 | Lederman | 280/688 |
| 4,276,971 | 7/1981 | Horvath | 29/402.17 X |
| 4,434,977 | 3/1984 | Chiba et al. | 280/668 |

Primary Examiner—Joseph F. Peters, Jr.
Assistant Examiner—Mitchell J. Hill
Attorney, Agent, or Firm—Charles R. White

[57] ABSTRACT

Vehicle suspension strut having onboard service of shock absorber cartridge through access opening in the mount tower and through the upper mount while the road wheel remains on the support surface.

11 Claims, 6 Drawing Figures

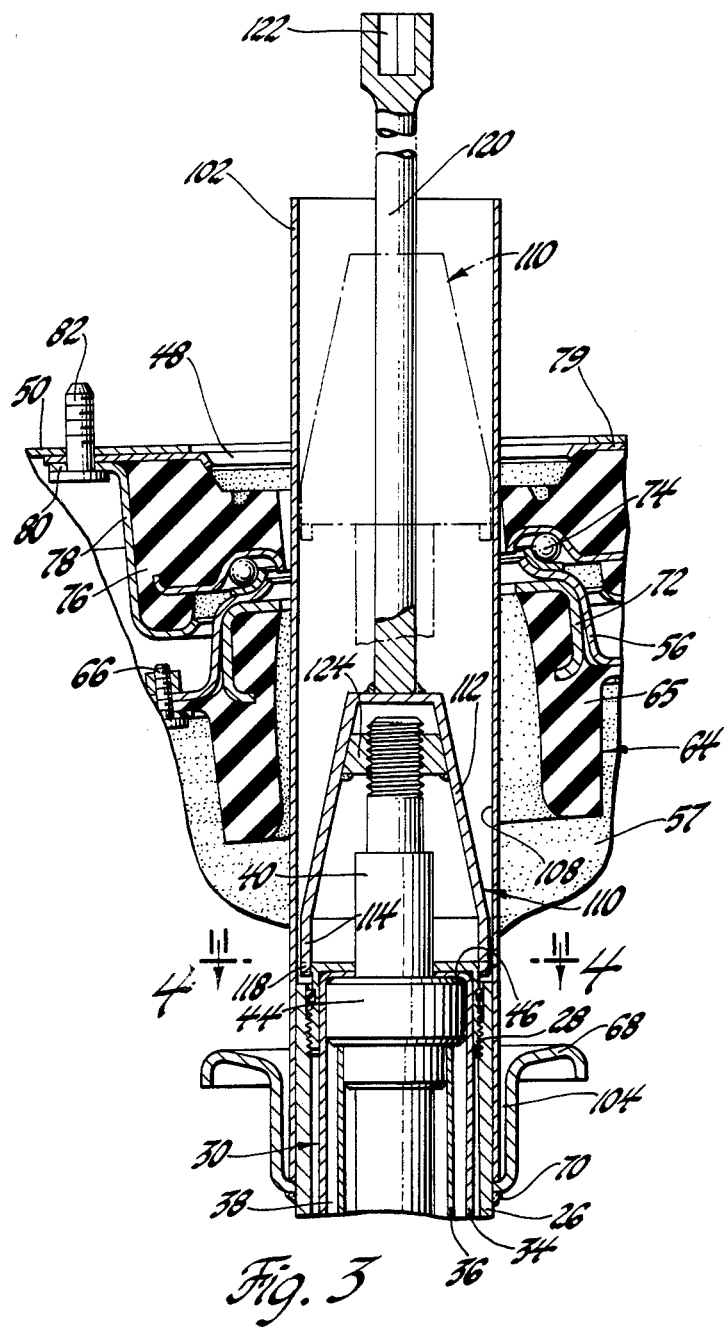

SUSPENSION STRUT FOR VEHICLES WITH ONBOARD SERVICE OF SHOCK ABSORBER CARTRIDGE

This invention relates to serviceable vehicle suspension struts and more particularly to a new and improved take-apart upper mount for a suspension strut that has a shock absorber cartridge therein accessible through the mount from the upper end of the strut for improved onboard service and replacement of the cartridge. This invention further relates to new and improved strut cartridge replacement procedure and new and improved tooling therefor.

Shock absorber replacement on a MacPherson type suspension strut generally involves labor intensive procedures. In such struts, a shock absorber is often designed into an outer support tube which is a load carrying element of the vehicle suspension. This strut may be referred to as a "wet build" strut. For service, this strut must be removed from the vehicle. This involves jacking the vehicle, removing the tire and wheel assembly and removing the strut assembly from the vehicle. In a typical case, the suspension coil spring extends around the support tube from a lower seat attached thereto and must be removed using a special spring compressing fixture. Since the strut is a highly specialized suspension load carrying component, it is expensive to remove and replace with a new strut or remove and rebuild with new shock absorber. In both cases subsequent "wheel alignment" is required.

To reduce strut replacement costs and improve strut serviceability, shock absorbers have been designed as replacement cartridges for insertion within the support tube of the strut. Such struts are often called "cartridge build" struts. However, replacement of cartridges has often involved strut removal from the vehicle generally along the lines stated above. With such strut removal, a cartridge build strut does not materially reduce the replacement service complexity and cost even though the service cartridge may be less costly than that of a complete strut. Prior "on board" serviceable struts in which worn original cartridges are replaced with service cartridges involve complex mount constructions and tedious service procedures. Also special bolts securing the cover plate to an upper mount are undesirably loaded in tension during jounce travel and during bottoming of the jounce bumper. During service of this prior strut, camber setting is disturbed so that cover plate position must be precisely marked before dismantling so that it can be reassembled in the same place to maintain camber adjustment. With this in mind, this invention provides advanced "on board" service improvement accomplished by strut cartridge replacement without the necessity of strut removal and attention to camber adjustment. To this end, improved cartridge access through a new and improved strut mount is provided. This invention eliminates vehicle jacking and wheel removal by providing for the positive retention of the suspension spring and strut when the upper strut load retention is removed. This invention also provides for steering functions, dual rate mount design and improved direction of the jounce control force path into the body tower structure so that the strut can remain as a support structure when it is serviced. With this invention "wheel alignment" is not changed during cartridge service so that the mechanic need not be concerned with any alignment procedures.

These and other objectives are obtained in this invention by a new and improved take-apart strut mount which allows access to the strut cartridge through a central service hole in the tower. In servicing the cartridge, a rebound stop cover plate assembly is removed so that a special tool can be threaded onto the end of the strut piston rod. A cylindrical aligning tube is passed over the tool and through the access hole in the strut mount. This tube slips over the upper end of the strut thereby acting to hold the strut in prescribed alignment with the mount for easy extraction or insertion of the cartridge after removal of the service nut. Replacement can be accomplished without the alignment tube but is more difficult and time consuming. By means of the special tooling which drivingly engages the threaded service nut on top of the strut, the support tube can be opened for cartridge removal and closed after a new cartridge has been inserted.

In order that jounce bumper loads be carried through the mount to the underside of the body tower structure and avoiding loading mounting bolts, the jounce bumper has been designed in an annular shape which reacts against the coil spring bearing and into the mount itself. The jounce bumper is attached to the upper spring seat in the conventional manner, with fasteners that also serve to attach the weather boot. The jounce bumper engages an annular bracket which is welded to the strut reservoir tube. This bracket also serves as a support for the aligning tube which is slipped over the strut during the service operation.

The spring bearing assembly is designed with an inner opening to form a part of the cylindrical service access hole. This bearing assembly carries spring and jounce loads into the high rate portion of the mount and may be ride tuned independently of the lower rate mount for the shock absorber piston rod which is retained by the removable cover plate.

These and other features, objects and advantages of this invention will become more apparent from the following detailed description and drawing in which:

FIG. 3 is a cross-sectional view similar to FIG. 2 with parts removed and with service tooling being used to remove the shock absorber cartridge of the suspension strut.

FIG. 4 is a cross-sectional view taken along lines 4—4 of FIG. 3.

FIG. 5 is an isometric view of service tooling used with the FIG. 3 removal of the cartridge.

FIG. 6 is an isometric view illustrating removal of the worn cartridge with the service tooling.

Figure 1:
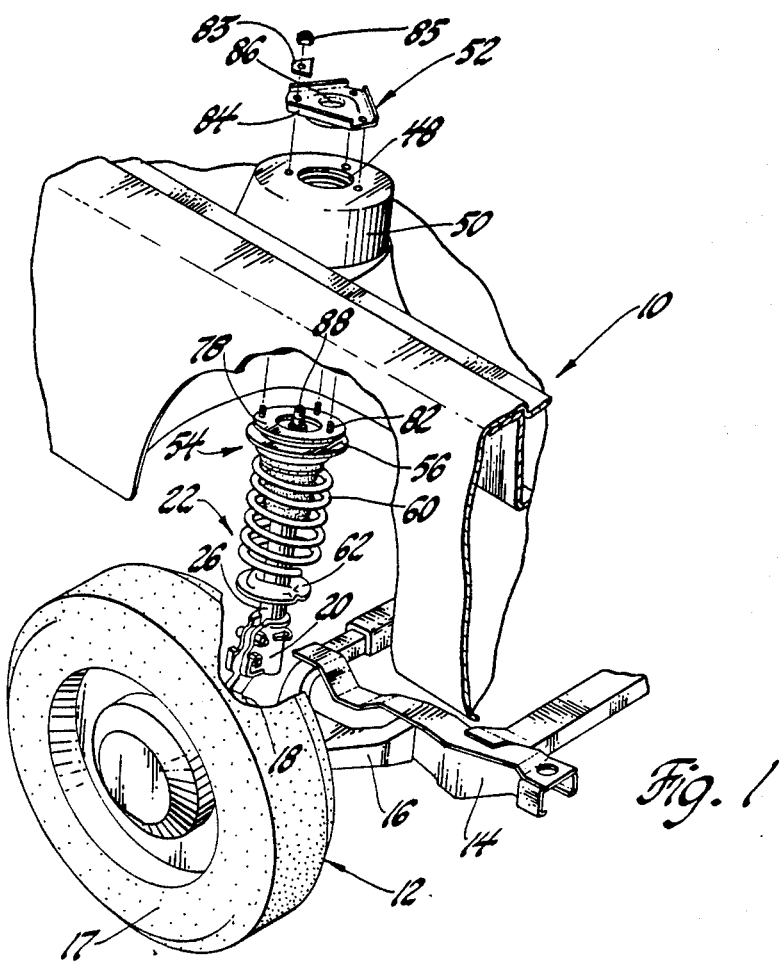
FIG. 1 is an isometric exploded view of a portion of a vehicle including a suspension strut interposed between a wheel assembly and a mounting tower formed in the vehicle body.

Turning now in greater detail to the drawing, there is shown in FIG. 1 a forward front quarter portion 10 of a motor vehicle having a steerable front wheel assembly 12 connected to vehicle frame 14 by a lower control arm 16. The wheel assembly includes a conventional road wheel 17 mounted on a wheel spindle and further includes a steering knuckle 18 having a cup-like mounting bracket 20 attached thereto. This mounting bracket provides the lower support for a vehicle suspension strut 22 which is a "cartridge build" unit such as shown in FIGS. 3, 4 and 5 of the patent to Horvath 4,276,971 issued July 7, 1981 for Vehicle Suspension Strut With Serviceable Shock Absorber and assigned to the assignee of this invention. The suspension strut 22 has a cylindrical outer support tube 26 which fits in the lower bracket 20 and extends upwardly therefrom. The upper end of the strut is closed by service nut 28 which is threaded in the end of the support tube and which retains a shock absorber cartridge 30 therein.

The shock absorber cartridge 30 is a conventional self-contained shock absorber unit which comprises an outer reservoir tube 34 that cooperates with an inner cylinder tube 36 to form a reservoir 38 for the shock absorber fluid of this unit. The clearance between the cartridge reservoir tube and the support tube 26 is an air space which does not communicate with the interior of the cartridge.

The cartridge contains a base valve, not shown, disposed on the lower end of the cylinder tube 36 to control flow of shock absorber fluid between the cylinder tube and the reservoir tube on compression and rebound stroke as explained in the patent to Horvath cited above. A cylindrical piston rod 40 extends axially upwardly from a piston 42 slidably mounted in the cylinder tube and through a rod guide and seal assembly 44 that is mounted in the upper end of the shock absorber cartridge. This rod guide and seal assembly is retained in place by the inwardly turned end 46 of the reservoir tube. The piston rod 40 extends upwardly through an annular opening 48 in a tower 50 formed in the vehicle body and is secured to this body work by cover plate assembly 52 which provides an upper portion of a suspension mount 54. The suspension mount further includes an annular spring seat 56 supported by the upper end coil of a helical suspension spring 60. The suspension spring 60 spirals around the outer support tube of the strut from an annular spring support plate 62 welded or otherwise secured to the support tube just above mounting bracket 20.

The upper spring seat 56 supports the convoluted weather boot 57 which protects the upper components of the strut. The seat also has a jounce bumper 64 secured by threaded fasteners 66. This bumper has a resilient cylindrical elastomer body 65 adapted to be engaged and deflected on road wheel jounce by an annular contact member or bracket 68 welded at 70 adjacent to the upper end of the outer support tube 26 to cushion and limit jounce movement. The jounce bumper 64 further includes a metallic jounce bumper stop 72 at its upper end which seats against the inner wall of the spring seat 56 to provide a positive stop to limit jounce stroke. Jounce loads generally follow path L through the mount 76 described below and do not load any mounting bolts in tension. Mounted on the upper side of the spring seat 56 is an inner race of an annular ball bearing unit 74. The outer race of this ball bearing unit is secured to a toroidal elastomer mount 76 by a cylindrical mounting bracket 78. The mounting bracket 78 has a washer-like cover plate 79 welded to an outer radial flange 80 that fits against the lower surface of the tower 50 and is secured thereto by bolts 82. The heads of bolts 82 are welded to the underside of bracket flange 80 and the threaded shanks of the bolts extend upwardly through the flange, cover plate 79, the top of the tower and rectangular washers 83. Hex nuts 85 are turned on the bolt shanks to secure the top plate assembly 52, mounting bracket 78 and toroidal mount to the tower 50.

Figure 2:
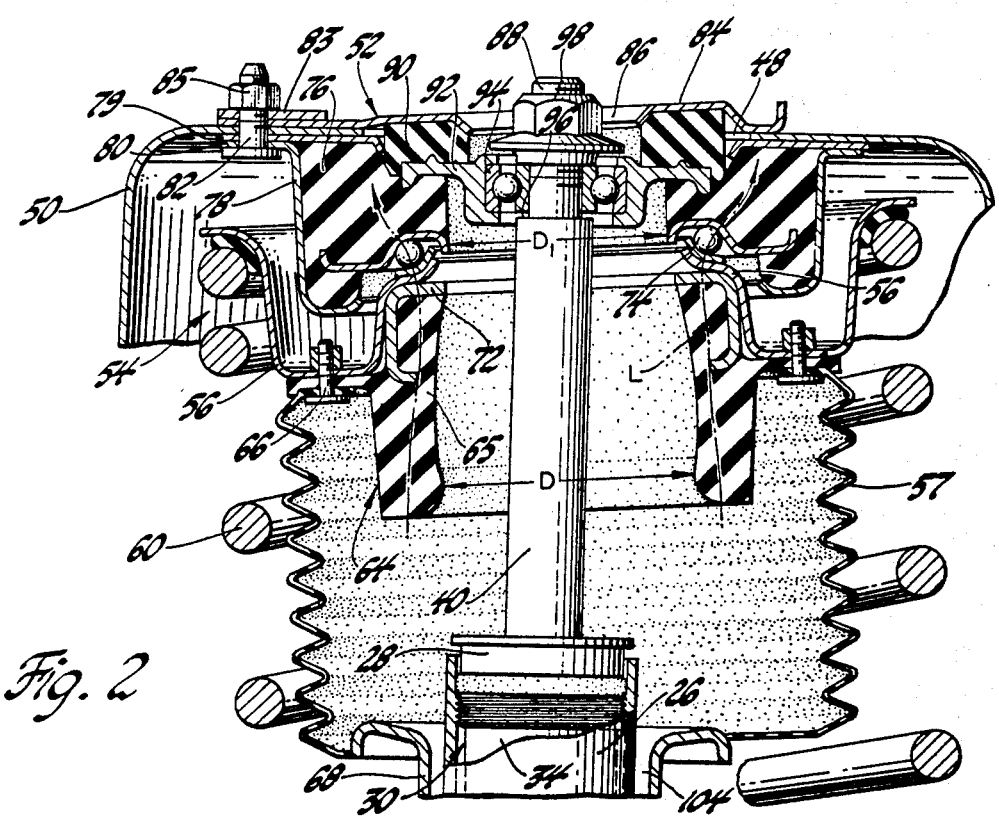
FIG. 2 is a cross-sectional view of an upper portion of the suspension strut and a portion of the tower.

The top plate 84 has an annular central opening 86 through which the threaded end portion 88 of the piston rod 40 extends. Piston rod jounce rubber 90 is bonded only to the lower surface of the top plate 84. A ball bearing unit 94 has an outer race entrapped in the inner annular wall of the shock absorber washer 92 as best shown in FIGS. 2 and 3. The inner race of this ball bearing unit seats on a shoulder 96 of the piston rod 40. A piston rod nut 98 threaded onto the end portion 88 of the piston rod secures the bearing unit 94 and the shock absorber washer 92 as an assembly to the piston rod. Jounce rubber 90 bonded only to top plate 84 provides a selected spring rate connection of the piston rod to the tower 50.

The inner diameters D and $D_1$ of the jounce bumper 64 and the elastomer mount 76 are greater than the diameter of the shock absorber cartridge 30 to permit axial removal of the cartridge after the cover plate assembly 52 is removed as a unit from tower 50. Cover plate assembly 52 removal is readily accomplished by initially removing the hex nuts 85 from retaining bolts 82. The top plate assembly 52 comprising the top plate 84 and the shock absorber jounce rubber 90 is manually grasped and removed as an assembly from the tower 50. The shock absorber washer and the bearing unit assembly is not part of the top plate assembly and is not removed at this time. Since wheel camber is not disturbed with this procedure, the position of plate 84 does not have to be marked to assure the same camber adjustment on reassembly.

The lateral stiffness of the suspension spring 60 will hold the strut and the suspension in place while the strut is being serviced by a person of some mechanical skill with conventional tools. With the car jacked up, the road wheel 17 removed, and the lower control arm supported, an installer can utilize conventional sockets to remove the piston rod nut 98 and cover plate nuts 85 so that the cover plate assembly 52 (top plate plus jounce rubber 90) can be removed. After removal of the piston rod nut 98, the washer 92 and bearing unit 94 are removed. The service nut 28 can then be removed with suitable tooling. The cartridge is then removed as a unit by manually grasping the piston rod 40 and removing the cartridge axially out of the support tube 26 and through the openings in jounce bumper 64 and elastomer mount 76. After installing the shock absorber washer 92 and the ball bearing unit 94 on the replacement cartridge and securing these parts in place with piston rod nut 98, installation of the replacement cartridge is the reverse of the above.

While the upper mount construction allows convenient access to the service nut and then to the cartridge for removal with conventional tooling, this invention also provides for removal of the cartridge retaining service nut and for extracting of the shock absorber cartridge without jacking and removal of the road wheel or any suspension component. This tooling is best illustrated in FIGS. 3-6 and includes a cylindrical alignment and support tube 102 of a predetermined length and diameter for axial insertion through the annular opening 48 in the tower and the openings in mount 76 and the jounce bumper 64. The lower end of the alignment and support tube slips over the support tube 26 of the strut and into a cylindrical pocket 104 formed between the jounce bumper contact member 68 and the support tube 26. When installed, the alignment and support tube 102 connects the support tube 34 of the strut to the elastomer mount and bracket 76 providing lateral support between the upper end of the strut and the tower. With this lateral support the road wheel can remain on the ground and vehicle jacking is eliminated. The suspension load path L is through the elastomer mount to the tower around opening 48 so that axial withdrawal of the worn cartridge and replacement with a new unit is facilitated.

With the alignment and support tube 102 in place, the inner cylindrical wall 108 accommodates a special wrench 110 for turning the service nut 28. The wrench 110 has a generally conical head 112 with an outer cylindrical surface 114 for slidably engaging the inner wall 108 of the alignment and guide tube so that the tooth openings 116 of the service nut can be readily engaged by the teeth 118 projecting from the forward wrench head 112. The wrench head 112 has a centralized shank 120 welded thereto which extends to a terminal socket 122. The socket 122 provides connection for a conventional ratchet or other wrenching tool to permit turning of the service nut 28 for removal or installation. The wrench head 112 has an interior nut 124 fixed thereto which is adapted to be threaded onto the end of the piston rod 40 to facilitate removal of the cartridge 30 in the preferred service procedure. When the wrench is threaded onto the piston rod end it is centered for subsequent coupling with the service nut. The service nut and wrench head may be of hex formation or other suitable shape if desired.

Assuming the top plate assembly 52 has been removed from the tower, the piston rod can be manually stroked or displaced outwardly and held. After removal of piston rod nut 98 and the shock absorber washer and bearing assembly, the nut 124 of the special wrench 110 can be threaded onto the end of the piston rod 40 to interconnect the tool with the piston rod. Using this tool, the piston rod is manually centered in the alignment and support tube 102. This tube is then slipped over the wrench 110 into the tool retainer pocket 104. This, as stated, holds the strut in alignment with the opening in the tower. The wrench 110 can then be moved axially displacing the piston and rod, until contact is made with the service nut 28. By rotation of the tool 110, the tooling lugs moved into engagement with the openings 116 in the service nut 28. The service nut can then be turned and loosened from the top of the strut. The piston and rod turn with the tool 110 and remain attached thereto. The tool 100 is then axially moved to extract the cartridge from the unit. After this is done, a new cartridge can be inserted in the strut and the service nut can be reinstalled utilizing a reverse procedure as described. After this is done, the wrench 110 and tube 102 are removed and the washer 92 and piston rod nut are reinstalled. The cover plate 52 is reinstalled to complete the repair.

While a preferred embodiment of the invention has been shown and described to illustrate the invention, other modifications will now become more apparent to those skilled in the art. Accordingly, the scope of this invention is set forth in the following claims.

The embodiments of the invention in which an exclusive property or privilege is claimed are defined as follows:

1. In a wheeled automotive vehicle having a body with suspension support structure, a serviceable vehicle suspension strut which mounts a road wheel of the vehicle to said support structure, said support structure having an access opening for servicing said strut, said strut comprising an outer support tube operatively connected to the vehicle road wheel and extending upwardly therefrom, a hydraulic shock absorber cartridge operatively mounted within said support tube and separable therefrom, said shock absorber cartridge having a piston and piston rod operatively mounted therein, a helical suspension spring having a lower end mounted to the support tube and extending upwardly therearound, an upper mount assembly for said strut, said upper mount assembly having a spring seat receiving the upper end of said suspension spring, a cylindrical jounce bumper fixed to said spring seat so that suspension jounce loads are transmitted therethrough, an elastomer mounting ring having an inner opening aligned with said access opening mounted on the underside of said support and having annular load contact with said spring seat so that said suspension spring supports the body of said vehicle, said upper mount assembly further having a cover plate assembly closing said access opening, said cover plate assembly having an upper plate disposed around said access opening and an elastomer member mounted under said upper plate for operative connection with the piston rod of said cartridge, said elastomer member providing a jounce load path for said piston rod in parallel with suspension jounce loads through said elastomer mounting ring, fastener means removably securing said cover plate assembly to said support structure and said piston rod to said cover plate assembly, said cover plate assembly when removed clearing said access opening allowing access to said strut through said mount assembly so that said shock absorber cartridge can be removed and replaced by a replacement shock absorber while said road wheel remains on the road.

2. In a wheeled automotive vehicle having a suspension support therein, a serviceable vehicle suspension strut which mounts a road wheel of the vehicle below and to said support, said support having a strut access opening therein, said strut comprising an outer support tube operatively connected to the vehicle road wheel and extending upwardly therefrom, a hydraulic shock absorber cartridge operatively mounted within said support tube and separable therefrom, a coiled suspension spring having a lower end coil mounted to the support tube and extending upwardly therearound, an upper mount assembly for said strut, said upper mount assembly having a spring seat and a resilient annular mount for receiving suspension loads through the upper end coil of said suspension spring, said upper mount assembly further having a cover plate assembly releasably secured to said support for closing said access opening, said cover plate assembly being removable from said support structure to separate said upper mount into separate assemblies to thereby uncover said access opening so that said shock absorber cartridge can be removed therethrough and replaced while said road wheel remains on the road wheel supporting surface.

3. A serviceable suspension strut which mounts a road wheel of a vehicle to support structure therein and incorporating a helical suspension spring operatively mounted between the strut and the support structure, a support tube operatively connected to the vehicle road wheel and extending upwardly therefrom, a hydraulic shock absorber cartridge having a piston and piston rod assembly operatively mounted in said support tube, said suspension spring having the lower end coil mounted to the support tube and extending upwardly therefrom around said support tube, an upper mount for said strut, said upper mount having a first section having a resilient elastomer member with an access opening therethrough an upper spring seat below the elastomer member for receiving the upper coil of said suspension spring, said upper mount further having a second section including an elastomer member operatively connected to said piston rod and an upper plate member operatively connected to said support structure for covering said access opening, fastener means removably securing said upper plate member to said support structure to provide access to said strut through said first section after removal of said first section so that said shock absorber can be serviced by removal of said cartridge from said support tube through said opening and replaced by a replacement shock absorber cartridge while said suspension spring supports said vehicle.

4. The strut defined in claim 3 and further including a service nut threadedly engaged on the end of said support tube for retaining said cartridge therein, a jounce bumper secured to said spring seat above the end of said support tube and said service nut, an annular jounce bumper contact bracket secured to said support tube below said jounce bumper, said contact bracket being spaced from said support tube to provide a pocket, a cylindrical sleeve disposed in said pocket and in said access opening after said second section plate is removed, a wrenching tool insertable in said sleeve for guidance thereby and for engaging and turning said service nut for the removal thereof and said cartridge to clear said support tube for the installation of a replacement cartridge and the service nut.

5. A mount for operatively connecting a vehicle suspension strut having a support tube with an upper end disposed beneath said mount and having an associated helical suspension spring to support structure in a vehicle, said mount comprising an annular spring seat having a centralized opening and having a flange for receiving the upper end coil of said spring, a generally cylindrical jounce bumper having a central opening therethrough supported by said spring seat above the upper end of said strut and engageable therewith to deflect and cushion and limit jounce motion of said strut, an elastomer mounting ring having a central opening therethrough secured to said support structure and disposed above said spring seat for receiving vehicle suspension load, said support structure having a strut access opening therethrough, fastener means connecting said elastomer mounting ring to said support structure adjacent to said access opening and a cover plate assembly removably attached to said support structure for uncovering said access opening in said support structure when removed to provide an unrestricted passage and an access to the upper end of said strut directly through said central openings in said jounce bumper and said mounting ring.

6. The mount defined in claim 5 wherein said cover plate assembly includes an elastomer jounce member and wherein said strut has a piston rod connected to the elastomer jounce member of said cover plate assembly, said elastomer mounting ring having an upper surface engaging said support structure immediately below and around said access opening to provide support for said vehicle when said cover plate assembly is removed and said cover plate assembly is removed from said support structure and from said piston rod.

7. The mount defined in claim 6 wherein said elastomer mounting ring has a predetermined spring rate and wherein said elastomer jounce member is mounted beneath said cover plate and has a spring rate lower than the spring rate of said mounting ring.

8. A method of removing and replacing a hydraulic shock absorber cartridge having a piston and piston rod operatively mounted therein, said cartridge being operatively mounted within a support tube of vehicle suspension strut while the road wheel supported by said strut remains on ground comprising the steps of: removing the support connecting the piston rod of the cartridge from an upper mount operatively connecting said strut to the body of a vehicle, axially guiding a tool through the upper mount into connection with a service nut threadedly attached to the upper end of said support tube, disconnecting said service nut from said support tube, subsequently axially withdrawing said cartridge from said support tube through an opening in the upper mount, inserting a replacement cartridge for the removed shock absorbing cartridge, placing a service nut over the piston rod of the replacement cartridge and threadedly connecting said service nut on said support tube to thereby secure said replacement cartridge within said support tube and operatively connecting said piston rod to said mount to thereby complete securement of said replacement shock absorber cartridge and the securement of said strut to supporting structure of said vehicle.

9. A method of servicing a shock absorber cartridge operatively mounted within the support tube of a vehicle suspension strut while said strut is supported by an upper mount and a helical suspension spring and while the road wheel mounted on said strut remains on the vehicle support surface comprising the steps of: removing a cover plate from an access opening in said upper mount, removing a nut and washer from the piston rod of said shock absorber cartridge and securing the end of the piston rod of said cartridge to a tool, inserting an alignment and stabilizing guide through said access opening onto the upper end of said support tube to maintain alignment of said support tube with said access opening, manipulating said tool until it drivingly engages a service nut screwed on the end portion of said support tube, unscrewing said service nut until it is removed from attachment with said support tube, using said tool to axially simultaneously withdraw said cartridge and said service nut from said strut and through said access opening to clear the interior of said support tube for reception of a replacement cartridge to be retained in said strut by said service nut when reattached to said strut.

10. Tooling for removing a shock absorber cartridge from a vehicle suspension strut while a vehicle is supported by the strut and for installing a new cartridge within the strut comprising a cylindrical strut support and socket guide tube adapted to fit around the exterior of an outer support tube of the suspension strut, a socket guided by said tube and adapted to drivingly fit in a service nut holding the shock absorber cartridge in said support tube and for turning of said service nut for removal and reinstallation thereof, and interior nut means in said wrench for operatively engaging a threaded end of a piston rod of the cartridge to permit the threaded connection of said socket and withdrawal of said cartridge through said guide tube by the axial movement of said socket.

11. The tooling defined in claim 10, wherein said guide tube has an outer diameter to engage an access opening in said vehicle and an inner diameter to engage the end of said support tube to provide lateral onboard support for a strut while being serviced.

* * * * *